United States Patent [19]
Hennecken et al.

[11] Patent Number: 5,298,322
[45] Date of Patent: Mar. 29, 1994

[54] PRESS PAD FOR HIGH-PRESSURE PRESSES

[75] Inventors: Bruno Hennecken; Paul Schmitz, both of Aachen, Fed. Rep. of Germany

[73] Assignee: Rheinische Filztuchfabrik GmbH, Stolberg, Fed. Rep. of Germany

[21] Appl. No.: 713,066

[22] Filed: Jun. 11, 1991

[30] Foreign Application Priority Data

Dec. 31, 1990 [EP] European Pat. Off. ........ 90125833.5

[51] Int. Cl.⁵ .................... B30B 15/02; D03D 15/00
[52] U.S. Cl. ................................. 428/285; 100/295; 139/420 A; 139/425 R; 156/583.1; 428/287
[58] Field of Search ............ 156/323, 580, 583.1, 156/583.3; 100/295, 297; 139/420 R, 425 R, 420 A; 428/285, 286, 257, 258, 259, 287

[56] References Cited

U.S. PATENT DOCUMENTS

| | | | |
|---|---|---|---|
| 3,639,807 | 2/1972 | McCune | 139/425 R |
| 4,637,511 | 1/1987 | Johnson et al. | 139/425 R |
| 4,776,160 | 10/1988 | Rees | 57/901 |
| 5,120,597 | 6/1992 | Takimoto et al. | 139/420 R |

FOREIGN PATENT DOCUMENTS

| | | | |
|---|---|---|---|
| 2817079 | 2/1979 | Fed. Rep. of Germany | 139/420 R |
| 20732 | 7/1979 | Japan | 139/420 R |
| 199842 | 9/1987 | Japan | 139/420 A |

Primary Examiner—Michael W. Ball
Assistant Examiner—Steven D. Maki
Attorney, Agent, or Firm—Spencer, Frank & Schneider

[57] ABSTRACT

A press pad for high-pressure multi-story presses for the production of high-pressure laminates, including a textile fabric including a plurality of yarns composed of aromatic polyamide, and metal filaments disposed in said textile fabric in an amount ranging from 10 to 25 weight percent, based on the total weight of the press pad, the metal filaments being helically wound around each of the aromatic polyamide yarns.

5 Claims, 1 Drawing Sheet

PRESS PAD FOR HIGH-PRESSURE PRESSES

BACKGROUND OF THE INVENTION

The invention relates to a press pad made of an asbestos-free material for multi-story high-pressure presses for the production of high-pressure laminates.

Such high-pressure presses are employed to produce decorative or industrial high-pressure laminates. These presses generally operate in a pressure range between 85 and 100 kP/cm$^2$ and at temperatures between about 130 and 160° C. The pressing time is about 20 to 120 minutes.

In such high-pressure presses, press pads serve the purpose of transferring the pressure over the full area of the laminate, and must be able to withstand the stated high pressures and temperatures.

Conventionally, kraft paper is employed as the press pad for high-pressure presses in a desired number of kraft paper layers. However, this has the disadvantages that heat does not pass very well through the press pad, and that the production cycles are relatively long.

Occasionally rubber pads are also employed.

Press pads are also available for low pressure presses, those operating in a pressure range up to about 35 kP/cm$^2$; these pads are composed of a textile fabric made of a yarn of aromatic polyamide and containing copper filaments in a proportion between about 80 to 95 weight percent with respect to the total weight of the press pad. These prior art press pads cannot be employed in high-pressure presses because the high pressure in the press would cause the metal filaments to cut through the yarn.

There are also press pads made of a textile material having a metal content of about 50 to 65%, but these pads are employed in multi-story presses for coating particle boards. Compared to multi-story presses for the production of high-pressure laminates, these presses operate with lower specific, operating pressures, namely up to about 65 kP/cm$^2$, and with higher temperatures, namely at about 160 to 200° C. Pressing times ar about 20 to 60 minutes.

In order to clarify the problems on which the invention is based, the requirements for a press pad for high-pressure presses will now be described in greater detail.

A press pad must be able to be deformed repeatedly under the influence of pressure, and over a longer period of time, while transferring pressure over the full area of the material being pressed (the laminate). Moreover, the press pad must be able to recover from the repeated compressions to such an extent that it is able to be sufficiently deformed during the next pressing process. These characteristics are significant factors for the service life of a press pad.

In high-pressure presses for the production of laminates, so-called decorative or industrial high-pressure laminates (HPL), kraft papers are employed at the present almost exclusively as press pads in a required number of layers. This has the drawback that the layers of paper must be cut and stacked at high costs of time and personnel. Moreover, the service life of these paper pads is short, the paper generally becoming brittle and worn after about 20 uses. It can then no longer be employed and must be discarded.

A press pad must also have good thermal conductivity independent of the thickness of the pad.

The thermal conductivity of the presently employed kraft papers is very low. In order to obtain a good padding effect, a plurality of kraft paper layers are required. But with every additional layer of paper, the quantity of heat transferred decreases. In practice this means that the heat loss must be compensated for by extending the time over which there is heating of the material being pressed or by increasing the temperature. High-pressure presses for the production of laminates (high-pressure laminates) generally operate in a pressure range between 85 and 100 kP/cm$^2$ and at temperatures between about 130 and 160° C.

Press pads must be able to withstand these high pressures and temperatures.

SUMMARY OF THE INVENTION

Consequently, it is an object of the invention to provide a press pad for high pressure multi-story presses which, compared with the prior art press pads of layers of kraft paper employed for this purpose, is distinguished by a particularly good pressure equalization over the surface area, and by a shortened production cycle.

This object and others to become apparent as the specification progresses, are accomplished by the invention according to which, briefly stated, the press pad is composed of a textile fabric made of a yarn of aromatic polyamide which is possibly mixed with other yarn materials and which, with respect to the total weight of the press pad, contains metal filaments in a proportion of between 0 and 70 weight percent.

Press pads made of the textile fabric of aromatic polyamide are able to withstand the high pressures acting on them in the described temperature range, with the fabric bond of the press pad composed, according to the invention, of yarns possibly with the addition of metal filaments, thus providing good pressure equalization over the area of the laminate to be pressed. Even without metal filaments added to the yarn, the invention results in noticeably improved heat transfer and thus a corresponding speeding up of the production process because the aromatic polyamides have a better thermal conductivity than kraft paper, and especially multi-layer kraft paper.

The thermal conductivity is noticeably improved if, as in a further preferred embodiment of the invention, metal filaments in the stated proportions are added to the yarn. The metal filaments are here arranged in such a manner that they ensure good heat transfer between the two faces of the press pad. Generally, the metal filaments will be wound around the yarns so that each metal fiber forms a multitude of contact points on the upper side of the press pad and simultaneously a multitude of contact points on the underside of the press pad.

In a corresponding manner, multi-layer fabrics can also be produced, with the plurality of metal contact points at the surfaces of the individual layers ensuring that heat is properly transferred through the multi-layer fabrics.

If one would employ noticeably more than the 70 weight percent metal filaments provided according to the invention, for example, as in the above-described prior art, eighty and more weight percent, the metal proportion would be too high and, if subjected to the high pressures involved in such high-pressure presses, would mechanically destroy the yarn of the fabric.

Mixed yarns of the above-described materials may be used.

It is important that the press pad be asbestos-free.

DESCRIPTION OF THE PREFERRED EMBODIMENTS

Figure 1:
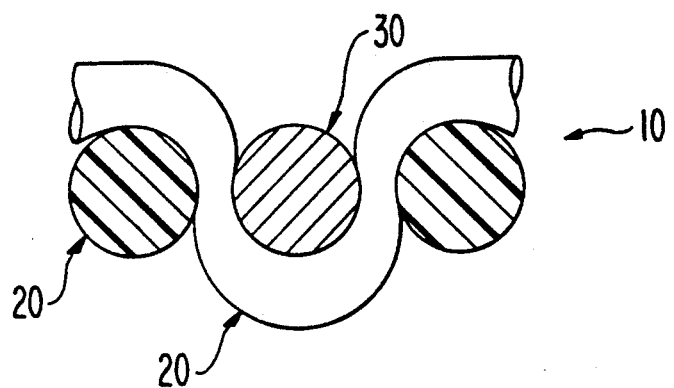
FIG. 1 is a sectional view of a portion of a preferred embodiment of a press pad according to the invention.

Turning to FIG. 1, the portion of a press pad 10 for use in multi-story high-pressure presses for producing high-pressure laminates shown therein has a variety of yarns 20 and 30 woven together like a piece of fabric, warp and weft being the preferred weave. Yarn 20 is made of an aromatic polyamide.

If metal filaments are added, a weight percentage between 10% and 70% for the metal filaments is preferred. Tests with weight percentages of 13%, 25% and 65% have achieved good results. The weight percentages of the possibly added metal filaments will be adapted to the respective conditions and requirements placed on the press pad by the respective high-pressure press. A yarn 30 is made entirely of metal.

Particularly good results are obtained with metal filaments made of brass. However, they may also be made of copper, or possibly also a mixture of both metals or of metal alloys. And it is conceivable to successfully employ metal filaments made of other metals.

The aromatic polyamides employed according to the invention are synthetic yarns which do not melt. Preferred are yarns sold by DuPont under the trade names NOMEX and KEVLAR. Other possible aromatic polyamides are TWARON made by Enka or CONEX made by Teijin. They all have in common that the fibers do not undergo structural changes at temperatures below 300° C. Above 380° C., decomposition begins. This listing, however, is only exemplary and not limiting. Mixed yarns of the above-described materials with one another or with other yarns may also be employed. Particularly good results were obtained with NOMEX.

It is also important that this textile fabric be free of asbestos.

The yarn material employed according to the invention is able to fully meet the requirements for deformability and the ability to recover over longer periods of time. Prior tests have confirmed this.

The padding effect of a press pad depends to a great extent on the quantity of textile material worked in. It is therefore provided to increase the weight per surface area of the press pad by increasing the quantity of textile material in conjunction with generally known weaving techniques and thus to further improve the padding effect.

The fabric may consist of one layer or several layers. The layers are interwoven by different techniques for warp (=longitudinal yarns) and weft (=transverse yarns).

The yarn material of aromatic polyamide or of mixtures with other yarn materials result in a noticeably improved heat transfer compared to the conventional kraft papers and thus in a corresponding speeding up of the production process and a saving of energy. Metal filaments of less than 50 weight percent, with respect to the total weight of the press pad, can also be employed with success. The thermal conductivity is further noticeably improved if metal filaments in a proportion up to a maximum of 70% of the total weight are added to the fabric. These additions of metal may be varied as desired between 0 and 70%. In this way, the heat transfer can be configured to meet existing requirements.

The metal filaments are arranged to ensure good heat transfer between the two faces of the press pad.

Figure 2:
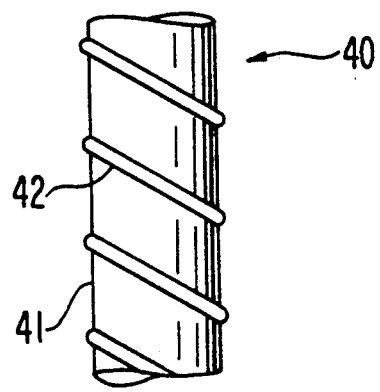
FIG. 2 is a plan view of a yarn for use in a further preferred embodiment of a press pad according to the invention.

Turning to FIG. 2, an alternative type of yarn for comprising a part of the press pad is shown therein. Yarn 40 includes a body 41 made of an aromatic polyamide, and a metal filament 42 is wrapped around body 41. Generally metal filaments 42 are wound around the yarns so that each metal filament forms a multitude of contact points at the upper surface of the press pad and simultaneously a multitude of contact points at the underside of the press pad.

Suitable metal yarns (monofilament or multifilament) are: copper, brass, other electrically conductive metals or any desired combinations and alloys of the described metals.

The metal yarns may be worked into the fabric in various ways:

a) as metal filaments 42 which are wound around the textile yarn 41 (as described above);
b) as pure metal yarn 30; or
c) as any desired combination of the yarns in a) and b).

The weft as well as the warp yarns, or both in any desired combination, may here be composed of:

a) a textile yarn or a mixture of yarns;
b) a metal yarn (monofilament or multifilament);
c) a textile yarn or a textile yarn mixture around which a metal yarn is wound; or
d) any desired combination of the yarns in a)–c).

Even for pads having a high padding effect, that is heavy, thick, or multi-layer fabrics, which normally have an insulating effect because of their greater density than thin pads, the heat transfer can be improved considerably by the addition of metal which thus contributes to optimization of the production process.

The excellent heat transfer in the press pads according to the invention enables the user to shorten the production cycle and/or save energy.

The selected yarn material inherently has the required temperature resistance since the upper, continuously effective temperature stress for polyamides lies at 280° C.

The pressure resistance under the required pressure conditions and over longer periods of time has in the meantime been confirmed by tests.

It will be understood that the above description of the present invention is susceptible to various modifications, changes, and adaptations, and the same are intended to be comprehended within the meaning and range of equivalents of the appended claims.

What is claimed is:

1. A press pad which is asbestos-free and which can withstand pressures ranging between 85 and 100 kP/cm$^2$ and temperatures ranging between 130 and 160° C. for high-pressure multi-story presses for the production of high-pressure laminates, comprising:

a textile fabric comprised of a plurality of yarns comprising aromatic polyamide; and a plurality of metal filaments disposed in the textile fabric in an amount ranging from 10 to 25 weight percent based on the total weight of the press pad, the metal filaments being helically wound around each of the aromatic polyamide yarns so that a proportion of the metal filaments is disposed on an outer surface of the textile fabric.

2. The press pad as defined in claim 1, wherein the textile fabric comprises a plurality of layers.

3. The press pad as defined in claim 1, wherein the plurality of yarns comprises a mixture of yarn materials.

4. The press pad as defined in claim 3, wherein the textile fabric comprises a plurality of layers.

5. The press pad as defined in claim 1, wherein the plurality of metal filaments is selected from the group consisting of at least one of brass and copper.

* * * * *